(12) United States Patent
Morris et al.

(10) Patent No.: US 12,628,849 B2
(45) Date of Patent: May 19, 2026

(54) SYSTEMS AND METHODS FOR INDEXING THE QUALITY OF AMINO ACIDS IN FEEDSTUFFS

(71) Applicant: Perdue AgriBusiness LLC, Salisbury, MD (US)

(72) Inventors: Dennis Logan Morris, Glade Spring, VA (US); Peter Samuel Yoder, Berlin, MD (US); Normand Roger St-Pierre, Tangier, VA (US); Jonas De Souza, Newberry, FL (US)

(73) Assignee: PERDUE AGRIBUSINESS LLC, Salisbury, MD (US)

(*) Notice: Subject to any disclaimer, the term of this patent is extended or adjusted under 35 U.S.C. 154(b) by 13 days.

(21) Appl. No.: 18/397,198

(22) Filed: Dec. 27, 2023

(65) Prior Publication Data

US 2024/0221092 A1    Jul. 4, 2024

Related U.S. Application Data

(60) Provisional application No. 63/477,720, filed on Dec. 29, 2022.

(51) Int. Cl.
    *A23K 10/00*        (2016.01)
(52) U.S. Cl.
    CPC .................................. *A23K 10/00* (2016.05)

(58) Field of Classification Search
    None
    See application file for complete search history.

(56) References Cited

U.S. PATENT DOCUMENTS

| | | | |
|---|---|---|---|
| 2006/0008546 A1* | 1/2006 | de Souza | A23K 10/12 |
| | | | 435/41 |
| 2009/0092715 A1* | 4/2009 | Beck | A23K 40/00 |
| | | | 426/231 |
| 2020/0260759 A1* | 8/2020 | Kerley | A23K 20/142 |

* cited by examiner

*Primary Examiner* — Alan Torrico-Lopez
(74) *Attorney, Agent, or Firm* — Michele V. Frank; Venable LLP

(57)        ABSTRACT

Systems, methods, and computer-readable storage media for estimating milk production. The system can receive a feed type for a feed provided to a milk producing animal, and identify a digestible rumen undegradable protein (dRUP) fraction of the feed type. The system then estimates a milk protein yield of the feed type using the dRUP fraction and at least one milk protein yield coefficient, each milk protein yield coefficient identifying how an amino acid effects the milk protein yield. The system then indexes the feed type to a known feed type based on the milk protein yield, resulting in an index value for the feed type, and generates a diet plan using the index value, the diet plan identifying an amount of the feed type for the milk producing animal to consume.

17 Claims, 4 Drawing Sheets

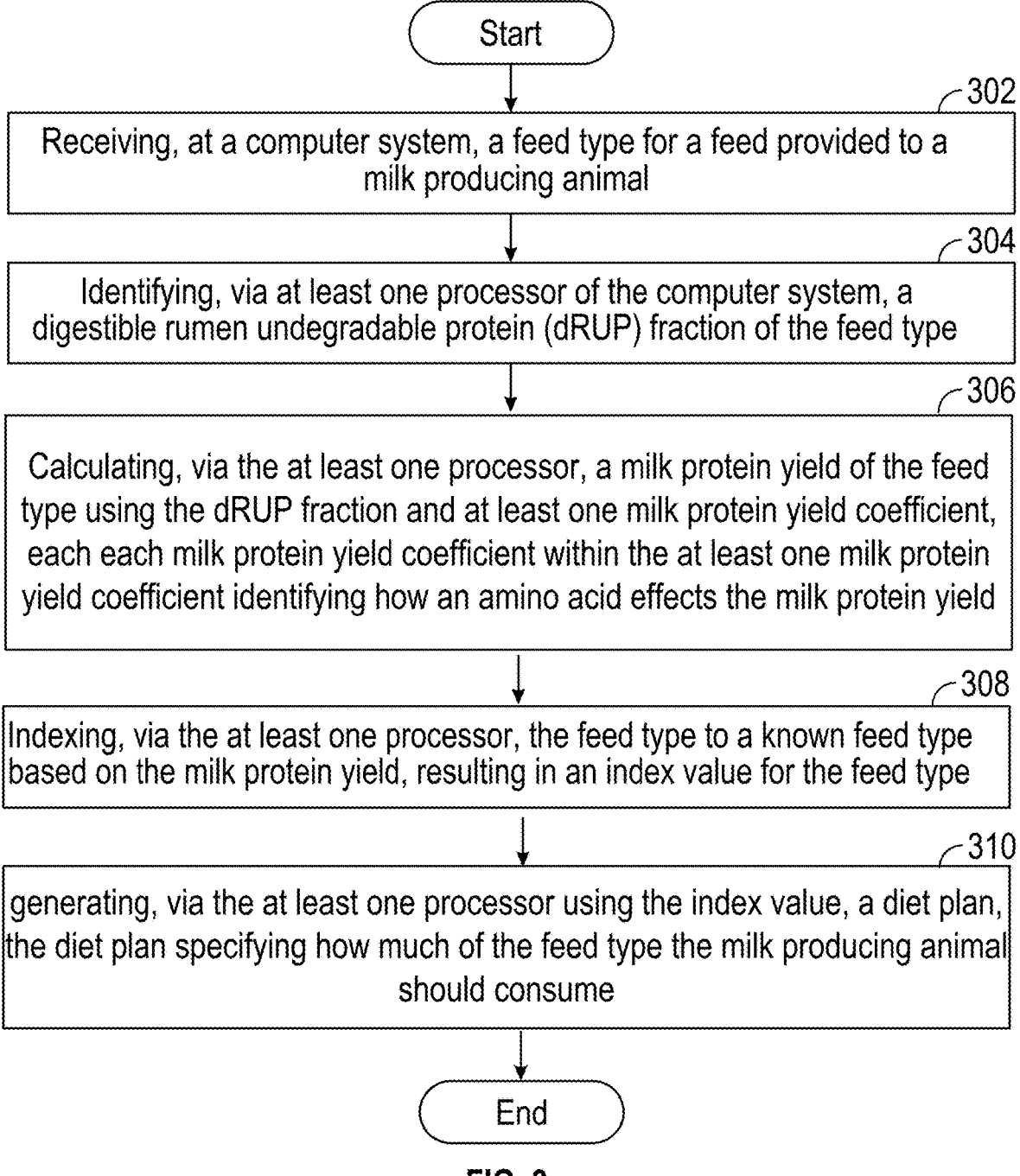

Start

302

Receiving, at a computer system, a feed type for a feed provided to a milk producing animal

304

Identifying, via at least one processor of the computer system, a digestible rumen undegradable protein (dRUP) fraction of the feed type

306

Calculating, via the at least one processor, a milk protein yield of the feed type using the dRUP fraction and at least one milk protein yield coefficient, each each milk protein yield coefficient within the at least one milk protein yield coefficient identifying how an amino acid effects the milk protein yield

308

Indexing, via the at least one processor, the feed type to a known feed type based on the milk protein yield, resulting in an index value for the feed type

310 generating, via the at least one processor using the index value, a diet plan, the diet plan specifying how much of the feed type the milk producing animal should consume End

FIG. 3

SYSTEMS AND METHODS FOR INDEXING THE QUALITY OF AMINO ACIDS IN FEEDSTUFFS

CROSS REFERENCE TO RELATED APPLICATIONS

This application claims priority to U.S. Provisional Patent Application No. 63/477,720, filed Dec. 29, 2022, which is hereby incorporated herein by reference in its entirety.

BACKGROUND

1. Technical Field

The present disclosure relates to estimating milk production, and more specifically to the influence of amino acids on milk production.

2. Introduction

Milk protein is an important milk constituent, and the concentration of milk protein within milk can be influenced by nutrition.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a computer system, a feed type for a feed provided to a milk producing animal; identifying, via at least one processor of the computer system, a digestible rumen undegradable protein (dRUP) fraction of the feed type; estimating, via the at least one processor, a milk protein yield of the feed type using the dRUP fraction and at least one milk protein yield coefficient, each milk protein yield coefficient within the at least one milk protein yield coefficient identifying how an amino acid affects the milk protein yield; indexing, via the at least one processor, the feed type to a known feed type based on the milk protein yield, resulting in an index value for the feed type; and generating, via the at least one processor using the index value, a diet plan, the diet plan specifying how much of the feed type the milk producing animal should consume.

A system configured to perform the concepts disclosed herein can include: at least one processor; and a computer-readable storage medium storing instructions which, when executed by the at least one processor, cause the at least one processor to perform operations comprising: receiving a feed type for a feed provided to a milk producing animal; identifying a digestible rumen undegradable protein (dRUP) fraction of the feed type; estimating a milk protein yield of the feed type using the dRUP fraction and at least one milk protein yield coefficient, each milk protein yield coefficient within the at least one milk protein yield coefficient identifying how an amino acid affects the milk protein yield; indexing the feed type to a known feed type based on the milk protein yield, resulting in an index value for the feed type; and generating, using the index value, a diet plan, the diet plan specifying how much of the feed type the milk producing animal should consume.

A non-transitory computer-readable storage medium configured as disclosed herein can have instructions stored which, when executed by a computing device, cause the computing device to perform operations which include: receiving a feed type for a feed provided to a milk producing animal; identifying a digestible rumen undegradable protein (dRUP) fraction of the feed type; estimating a milk protein yield of the feed type using the dRUP fraction and at least one milk protein yield coefficient, each milk protein yield coefficient within the at least one milk protein yield coefficient identifying how an amino acid affects the milk protein yield; indexing the feed type to a known feed type based on the milk protein yield, resulting in an index value for the feed type; and generating, using the index value, a diet plan, the diet plan specifying how much of the feed type the milk producing animal should consume.

BRIEF DESCRIPTION OF THE DRAWINGS

FIG. 3 illustrates an example method embodiment.

DETAILED DESCRIPTION

Figure 1:
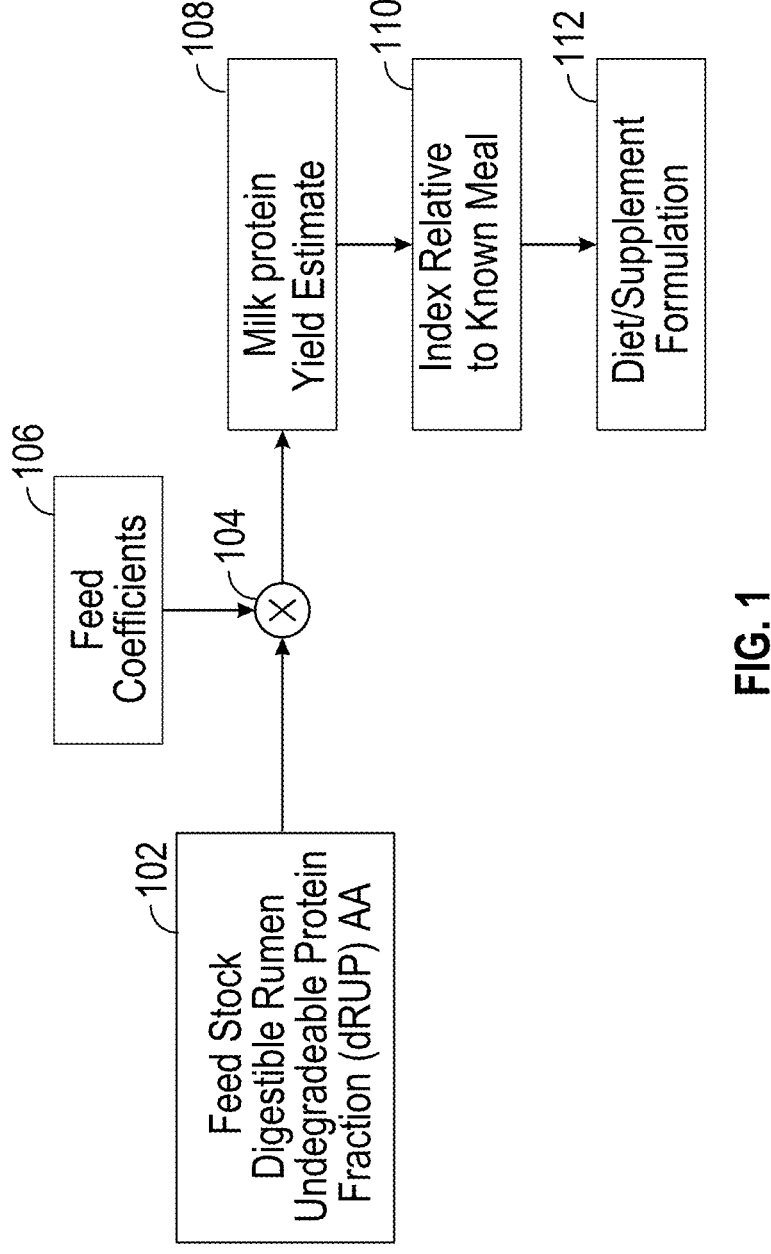
FIG. 1 illustrates an example data flow diagram.

Various embodiments of the disclosure are described in detail below. While specific implementations are described, this is done for illustration purposes only. Other components and configurations may be used without parting from the spirit and scope of the disclosure.

A majority of milk produced in the United States is valued based on yield of milk fat, protein, lactose, and minerals. Generally, milk protein is most valuable of these components. Amino acids (AA) are commonly fed to lactating dairy cows to increase milk protein production. Historically, milk protein product was thought to be driven by the most limiting AA supplied to a lactating cow, with methionine and lysine being the most limiting AA in most diets. More recently, it has been established that several, if not all, essential amino acids influence milk protein production. The new nutrient requirement of dairy cattle show that all 20 amino acids can be used to predict milk protein, with five essential amino acids (methionine (Met), lysine (Lys), isoleucine (Ile), leucine (Leu), and histidine (His)) being the most important. In addition, arginine (Arg), phenylalanine (Phe), threonine (Thr), tryptophan (Trp), and valine (Val) are considered essential amino acids in dairy cattle. Because of this, the supply of all 20 amino acids consumed by an animal on a given diet can be used to predict milk protein production by that animal. Nonessential amino acids include: alanine, asparagine, aspartate, cystine, glutamate, glycine, ornithine, proline, serine, and tyrosine. The method of the present invention can utilize indexing of one or more and up to all ten essential amino acids. The method can also include all 20 amino acids, or a subset of amino acids. Although methods are described for indexing essential amino acids, non-essential amino acids can be indexed in a similar manner Feed meals provided to milk producing animals (such as cows, goats, or other mammals for the purpose of milk production) often use five to ten different products, each with a dozen different ingredients. Farmers and organizations deciding what to feed those milk producing animals must do a multiple variable optimization for those meals to meet specific nutrient targets. Multiple variable optimizations can be computationally complex. The systems and methods disclosed herein can reduce computational complexity of that optimization analysis by using an amino acid index.

More specifically, systems configured as disclosed herein can determine the AA quality of a given feedstuff or mixture of feedstuffs, then analyze how that feedstuff compares to other feedstuffs with known milk protein production. For example, utilizing ration formulation programs (e.g., the Cornell Net Carbohydrate and Protein System (CNCPS), the National Academy of Science, Engineering, and Math 2021 (NASEM, 2021), etc.), the system can determine the yield of AA from the digestible rumen undegradable protein (dRUP) fraction of a given feed. The system can then multiply the yield of dRUP AA from a given feed by the coefficients from a prediction equation, resulting in an estimation of milk protein yield from a given feed. An example of this calculation is illustrated in Table 1.

TABLE 1

| Feedstuff AA | Soybean meal dRUP AA, g/lb | Blood meal dRUP AA, g/lb | Coefficient, g milk/g of AA[1] | Resulting milk protein production from 1 lb soybean meal, g[2] | Resulting milk protein production from 1 lb blood meal (avg), g[2] |
|---|---|---|---|---|---|
| Digestible Met | 1.5 | 2.3 | 1.84 | 2.8 | 4.2 |
| Digestible Lys | 6.2 | 16.9 | 1.15 | 7.1 | 19.4 |
| Digestible Leu | 7.7 | 24.2 | 0.47 | 3.6 | 11.4 |
| Digestible Ile | 4.6 | 2.3 | 0.89 | 4.1 | 2.0 |
| Digestible His | 2.7 | 11.6 | 1.68 | 4.5 | 19.5 |
| Other AA | 77.9 | 147.9 | 0.077 | 6.0 | 11.4 |
| Expected milk protein | | | | 28.1 | 68.0 |
| AA index3 | | | | 100% | 242% |

As an example of the calculations in Table 1, the 1.5 of the Soybean meal dRUP AA multiplied by the 1.84 coefficient results in the 2.8.

Once the estimated milk protein yield of the given feedstuff is known, the system can index a given feed relative to soybean meal (e.g., a soybean meal containing 48% crude protein) by dividing the estimated milk protein from a given AA (illustrated in Table 1) for a given feed by the estimated milk protein from AA for soybean meal, with the value provided as a percentage. This calculated value is termed AA index, and is illustrated in Table 2.

TABLE 2

| Feedstuff | As fed lbs | AA Index, %[1] |
|---|---|---|
| Blood meal (ring dried) | 1.0 | 325% |
| Blood meal (average) | 1.0 | 242% |
| Feather meal | 1.0 | 160% |
| Heat-treated soybean meal | 1.0 | 141% |
| Soybean meal, 48% CP | 1.0 | 100% |
| Canola meal | 1.0 | 82% |
| DDGS | 1.0 | 75% |

Thus, looking at Table 2, an animal consuming a Blood meal (average) will produce an estimated 142% more milk than an animal consuming a Soybean meal (i.e., 242%-

100%). In some configurations, the system can calculate the AA index for a mixture of protein source relative to a predetermined mixture. For example, rather than establishing the index relative to a Soybean meal, the system can establish the index to a Feather meal, a mix of Soybeans and Canola, or any other feedstuff or mixture of feedstuffs.

Once the system calculates the AA index values, the AA index values can be used to formulate of diets and supplements for lactating dairy animals. Non-limiting examples of milk producing animals can include cows, goats, etc. In this manner the AA index takes a multidimensional equation and condenses it into a single variable. The system can then use that variable in ration formulation to maintain milk protein product, where the computations required for the system to calculate rations is reduced due to the reduction of required variables. The system can, for example, be used for least cost formulation of diets for lactating cow diets, identifying protein supplements for lactating cows. Other equations besides NASEM (2021) can be used by the system.

In addition, in some configurations the system can be used by the user to perform an economic analysis of the available feedstuffs. For example, the user can input the costs of the available feedstuffs into the system. Then, if (based on the AA index) the system determines that a first feedstuff results in an increased milk protein production compared to a second feedstuff, the system can compare the differences in costs of the first and second feedstuffs against the increase in milk production to determine which feedstuff, or which combination of feedstuff, is the most economically efficient for the predicted amount of resulting milk protein.

FIG. 1 illustrates an example data flow diagram. In this example, the system uses previously calculated digestible rumen Undegradable Protein (dRUP) fraction for a feedstock 102. If the feedstock is a known, homogenous feedstock, the dRUP fraction may already be known for that feedstock. If the feedstock is non-homogenous (e.g., a combination of two or more different feedstocks), the system can calculate the non-homogenous feedstock specific dRUP fraction based on weight of each component feedstock. The system then multiplies 104 the dRUP AA fraction 102 by the feed coefficients 106, resulting in a milk protein yield estimate 108. The system then indexes the milk protein yield estimate to a known meal 110, and formulates a diet/supplement 112 for the animal. In some configurations, the system can also receive information about the animal's current diet, identify gaps within the current diet (e.g., certain types of amino acids which are missing and which, if added to the diet, would improve milk protein production), and formulate the diet/supplement 112 based on those gaps. In yet other configurations, the system can receive a goal amount of milk protein production the farmer or other user associated with the animal looks to achieve. The system can then provide a diet 112 which is designed to achieve that goal amount of milk protein production.

Figure 2:
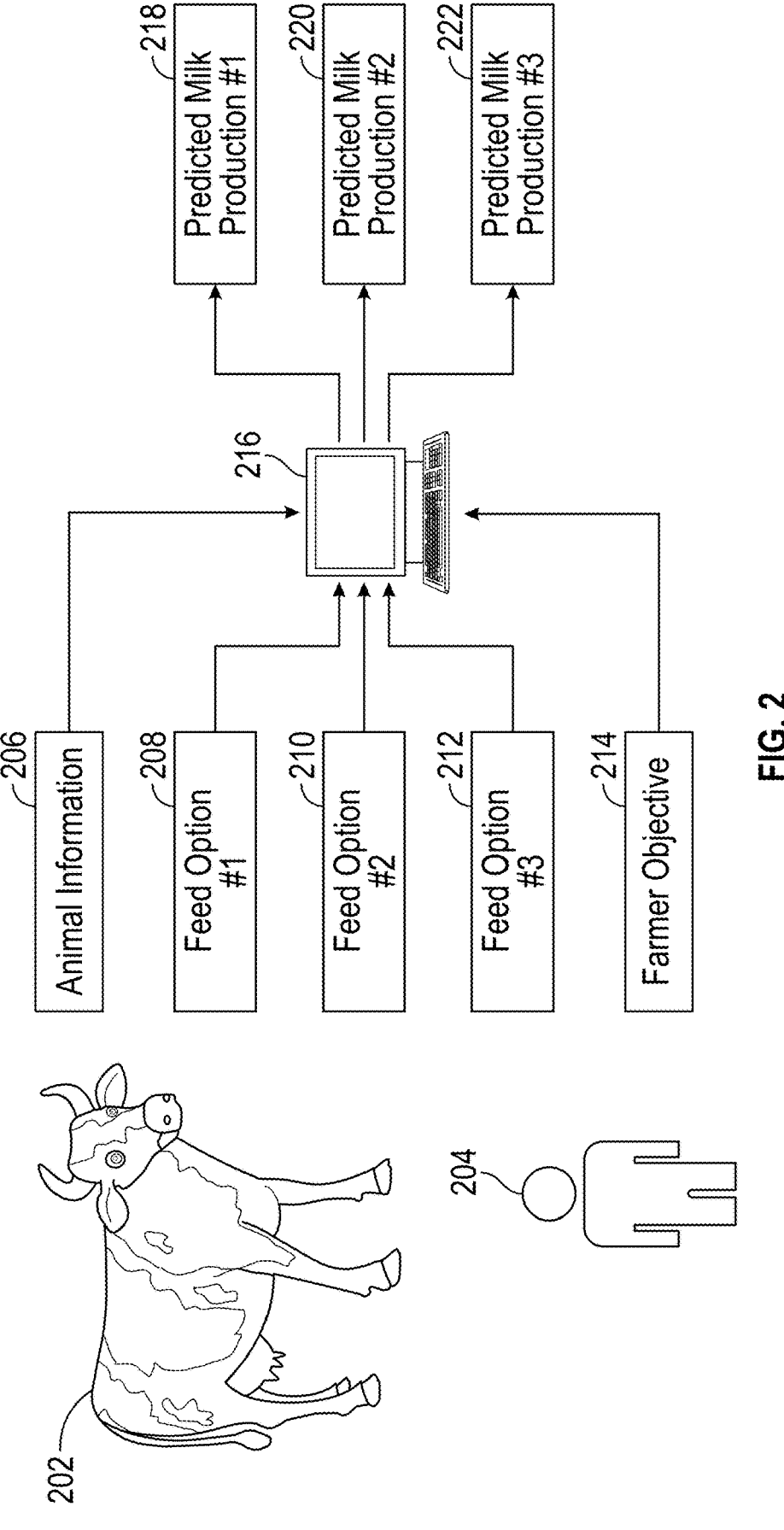
FIG. 2 illustrates an example system embodiment.

FIG. 2 illustrates an example system embodiment. The system 216, as illustrated, can perform various types of analyses to make predictions 218, 220, 222 for an animal 202 depending on the dietary options 208, 210, 212 given to the animal 202. In this example, the animal 202 is a cow, whereas in other configurations the animal 202 may be a different milk producing animal, such as a goat, camel, etc.

In one example, the system 216 can receive animal information 206 associated with an animal 202. Exemplary animal information 206 may be the age of the animal, the breed of the animal, time since giving birth, etc. The system 216 can also be given information about various feed options 208, 210, 212, and generate milk production predictions 218, 220, 222 for each of those feed options 208, 210, 212 (that is, feed option #1 208 would result in predicted milk production #1 218, etc.) based on the animal information.

In another example, the farmer 204 working with the animal 202 can provide an objective 214 to the system 216, such as a desired amount of milk production, and various feed options 208, 210, 212 which the farmer 204 has available. The system 216 can then provide predictions 218, 220, 222 for the available feed options 208, 210, 212, as well as a prediction/suggestion for the farmer 204 to achieve the desired milk production using the available feed options 208, 210, 212 (including one or more combinations of the available feed options 208, 210, 212).

FIG. 3 illustrates an example method embodiment. As illustrated, the method can include receiving, at a computer system, a feed type for a feed provided to a milk producing animal (302) and identifying, via at least one processor of the computer system, a digestible rumen undegradable protein (dRUP) fraction of the feed type (304). In some configurations, this identifying of the dRUP fraction is based on previous analysis (e.g., looking up a fraction associated with the particular feed type in a database). The method continues by calculating, via the at least one processor, a milk protein yield of the feed type using the dRUP fraction and at least one milk protein yield coefficient, each milk protein yield coefficient within the at least one milk protein yield coefficient identifying how an essential amino acid affects the milk protein yield (306). The method can then index, via the at least one processor, the feed type to a known feed type based on the milk protein yield, resulting in an index value for the feed type (308) and generate, via the at least one processor using the index value, a diet plan, the diet plan specifying how much of the feed type the milk producing animal should consume (310).

In some configurations, the at least one milk protein yield coefficient is associated with at least one of methionine, lysine, isoleucine, leucine, and histidine. In some configurations, the at least one milk protein yield coefficient is associated with all of methionine, lysine, isoleucine, leucine, and histidine. In some configurations, the at least one milk protein yield coefficient is associated with all 10 essential amino acids.

In some configurations, the at least one milk protein yield coefficient comprises coefficients for all 20 amino acids, whereas in other configurations the at least one milk protein yield coefficient can comprise coefficients for a sub-portion (e.g., 5, 10, or 20) of amino acids.

In some configurations, the diet plan comprises a protein supplement for the milk producing animal.

In some configurations, the known feed type is a soybean meal.

In some configurations the illustrated method can further include: receiving, at the computer system, a current milk production of the milk producing animal; and modifying, via the at least one processor, the diet plan to maintain the current milk production using the feed type.

In some configurations the illustrated method can further include: receiving, at the computer system, a current diet of the milk producing animal; and updating, via the at least one processor, the current diet based on the diet plan, resulting in identification of at least one protein supplement for the milk producing animal.

Figure 4:
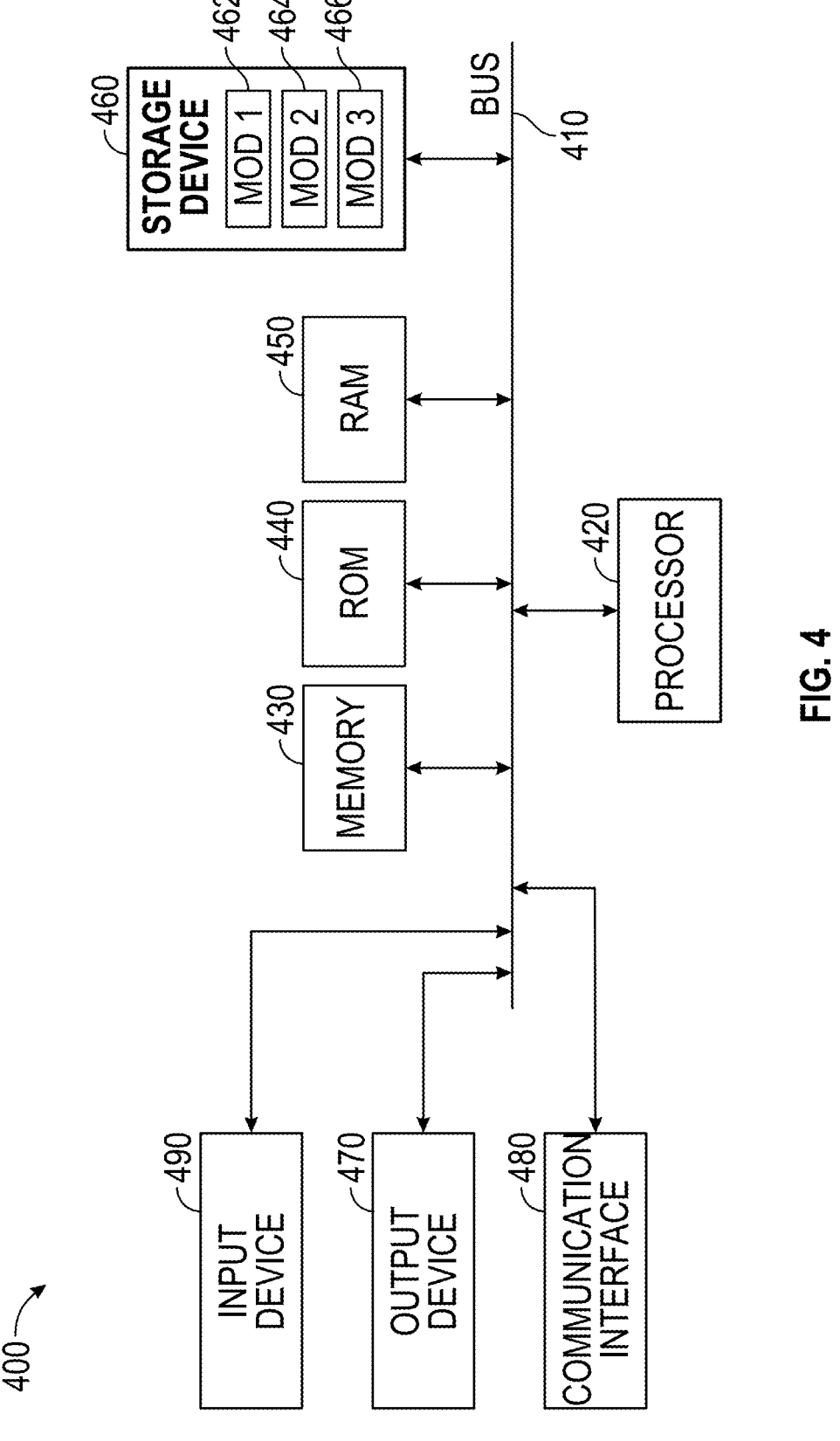
FIG. 4 illustrates an example computer system.

With reference to FIG. 4, an exemplary system includes a general-purpose computing device 400, including a processing unit (CPU or processor) 420 and a system bus 410 that couples various system components including the system memory 430 such as read-only memory (ROM) 440 and random-access memory (RAM) 450 to the processor 420. The system 400 can include a cache of high-speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general-purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

Further aspects of the present disclosure are provided by the subject matter of the following clauses.

CLAIMS LISTING

A method comprising: receiving, at a computer system, a feed type for a feed provided to a milk producing animal; identifying, via at least one processor of the computer system, a digestible rumen undegradable protein (dRUP) fraction of the feed type; estimating, via the at least one processor, a milk protein yield of the feed type using the dRUP fraction and at least one milk protein yield coefficient, each milk protein yield coefficient within the at least one milk protein yield coefficient identifying how an amino acid affects the milk protein yield; indexing, via the at least one processor, the feed type to a known feed type based on the milk protein yield, resulting in an index value for the feed type; and generating, via the at least one processor using the index value, a diet plan, the diet plan specifying how much of the feed type the milk producing animal should consume.

A method of any preceding clause, wherein the at least one milk protein yield coefficient is associated with at least one of methionine, lysine, isoleucine, leucine, and histidine.

A method of any preceding clause, wherein the at least one milk protein yield coefficient is associated with all of methionine, lysine, isoleucine, leucine, and histidine.

A method of any preceding clause, wherein the at least one milk protein yield coefficient is associated with all 10 essential amino acids.

A method of any preceding clause, wherein the at least one milk protein yield coefficient comprises coefficients for all 20 amino acids.

A method of any preceding clause, wherein the at least one milk protein yield coefficient comprises coefficients for from five to twenty amino acids.

A method of any preceding clause, wherein the at least one milk protein yield coefficient can comprise coefficients for a sub-portion (e.g., 5, 10, or 20) of amino acids.

A method of any preceding clause, wherein the diet plan comprises a protein supplement for the milk producing animal.

A method of any preceding clause, wherein the known feed type is a soybean meal.

A method of any preceding clause, further comprising: receiving, at the computer system, a current milk production of the milk producing animal; and modifying, via the at least one processor, the diet plan to maintain the current milk production using the feed type.

A method of any preceding clause, further comprising: receiving, at the computer system, a current diet of the milk producing animal; and updating, via the at least one processor, the current diet based on the diet plan, resulting in identification of at least one protein supplement for the milk producing animal.

A system comprising: at least one processor; and a computer-readable storage medium storing instructions which, when executed by the at least one processor, cause the at least one processor to perform operations comprising: receiving a feed type for a feed provided to a milk producing animal; identifying a digestible rumen undegradable protein (dRUP) fraction of the feed type; estimating a milk protein yield of the feed type using the dRUP fraction and at least one milk protein yield coefficient, each milk protein yield coefficient within the at least one milk protein yield coefficient identifying how an amino acid affects the milk protein yield; indexing the feed type to a known feed type based on the milk protein yield, resulting in an index value for the feed type; and generating, using the index value, a diet plan, the diet plan specifying how much of the feed type the milk producing animal should consume.

The system of any preceding clause, wherein the at least one milk protein yield coefficient is associated with at least one of methionine, lysine, isoleucine, leucine, and histidine.

The system of any preceding clause, wherein the at least one milk protein yield coefficient is associated with all of methionine, lysine, isoleucine, leucine, and histidine.

The system of any preceding clause, wherein the at least one milk protein yield coefficient is associated with all 10 essential amino acids.

The system of any preceding clause, wherein the at least one milk protein yield coefficient comprises coefficients for all 20 amino acids.

The system of any preceding clause, wherein the at least one milk protein yield coefficient comprises coefficients for from five to twenty amino acids.

The system of any preceding clause, wherein the at least one milk protein yield coefficient can comprise coefficients for a sub-portion (e.g., 5, 10, or 20) of amino acids.

The system of any preceding clause, wherein the diet plan comprises a protein supplement for the milk producing animal.

The system of any preceding clause, wherein the known feed type is a soybean meal.

The system of any preceding clause, the computer-readable storage medium having additional instructions stored which, when executed by the at least one processor, cause the at least one processor to perform operations comprising: receiving a current milk production of the milk producing animal; and modifying the diet plan to maintain the current milk production using the feed type.

The system of any preceding clause, the computer-readable storage medium having additional instructions stored which, when executed by the at least one processor, cause the at least one processor to perform operations comprising: receiving a current diet of the milk producing animal; and updating the current diet based on the diet plan, resulting in identification of at least one protein supplement for the milk producing animal.

A non-transitory computer-readable storage medium having instructions stored which, when executed by at least one processor, cause the at least one processor to perform operations comprising: receiving a feed type for a feed provided to a milk producing animal; identifying a digestible rumen undegradable protein (dRUP) fraction of the feed type; estimating a milk protein yield of the feed type using the dRUP fraction and at least one milk protein yield coefficient, each milk protein yield coefficient within the at least one milk protein yield coefficient identifying how an amino acid affects the milk protein yield; indexing the feed type to a known feed type based on the milk protein yield, resulting in an index value for the feed type; and generating, using the index value, a diet plan, the diet plan specifying how much of the feed type the milk producing animal should consume.

The non-transitory computer-readable storage medium of any preceding clause wherein the at least one milk protein yield coefficient is associated with at least one of methionine, lysine, isoleucine, leucine, and histidine.

The non-transitory computer-readable storage medium of any preceding clause, wherein the at least one milk protein yield coefficient is associated with all of methionine, lysine, isoleucine, leucine, and histidine.

The non-transitory computer-readable storage medium of any preceding clause, wherein the at least one milk protein yield coefficient is associated with all 10 essential amino acids.

The non-transitory computer-readable storage medium of any preceding clause, wherein the at least one milk protein yield coefficient comprises coefficients for all 20 amino acids.

The non-transitory computer-readable storage medium of any preceding clause, wherein the at least one milk protein yield coefficient comprises coefficients for five to twenty amino acids.

The non-transitory computer-readable storage medium of any preceding clause, wherein the at least one milk protein yield coefficient can comprise coefficients for a sub-portion (e.g., 5, 10, or 20) of amino acids.

The non-transitory computer-readable storage medium of any preceding clause wherein the diet plan comprises a protein supplement for the milk producing animal.

The non-transitory computer-readable storage medium of any preceding clause, wherein the known feed type is a soybean meal.

The non-transitory computer-readable storage medium of any preceding clause, having additional instructions stored which, when executed by the at least one processor, cause the at least one processor to perform operations comprising: receiving a current milk production of the milk producing animal; and modifying the diet plan to maintain the current milk production using the feed type.

We claim:

1. A method comprising:

providing a first feed to a milk producing animal, the first feed having a feed type, the milk producing animal producing first milk having a first milk protein yield after consuming the first feed;

identifying, via at least one processor of the computer system, a digestible rumen undegradable protein (dRUP) fraction of the feed type;

generating, via the at least one processor, an estimated milk protein yield of the feed type using the dRUP fraction and at least one milk protein yield coefficient, each milk protein yield coefficient within the at least one milk protein yield coefficient identifying how an amino acid affects the estimated milk protein yield;

indexing, via the at least one processor, the feed type to a known feed type based on the estimated milk protein yield, resulting in an index value for the feed type;

generating, via the at least one processor using the index value, a diet plan, the diet plan specifying (a) how much of the feed type the milk producing animal should consume, and (b) a protein supplement for the milk producing animal, the protein supplement providing at least one amino acid missing from a current diet of the milk producing animal; and providing additional feed to the milk producing animal according to the diet plan such that second milk is produced, the second milk having a second milk protein yield distinct from the first milk protein yield.

2. The method of claim 1, wherein the at least one milk protein yield coefficient is associated with at least one of methionine, lysine, isoleucine, leucine, and histidine.

3. The method of claim 1, wherein the at least one milk protein yield coefficient comprises coefficients for five to twenty amino acids.

4. The method of claim 1, wherein the known feed type is a soybean meal.

5. The method of claim 1, further comprising:

receiving, at the computer system, a current milk production of the milk producing animal; and modifying, via the at least one processor, the diet plan to maintain the current milk production using the feed type.

6. The method of claim 1, further comprising:

receiving, at the computer system, a current diet of the milk producing animal; and updating, via the at least one processor, the current diet based on the diet plan, resulting in identification of at least one protein supplement for the milk producing animal.

7. A system comprising:

at least one processor; and a computer-readable storage medium storing instructions which, when executed by the at least one processor, cause the at least one processor to perform operations comprising:

providing a first feed to a milk producing animal, the first feed having a feed type, the milk producing animal producing first milk having a first milk protein yield after consuming the first feed;

identifying a digestible rumen undegradable protein (dRUP) fraction of the feed type;

generating an estimated milk protein yield of the feed type using the dRUP fraction and at least one milk protein yield coefficient, each milk protein yield coefficient within the at least one milk protein yield coefficient identifying how an amino acid affects the estimated milk protein yield;

indexing the feed type to a known feed type based on the estimated milk protein yield, resulting in an index value for the feed type;

generating, using the index value, a diet plan, the diet plan specifying (a) how much of the feed type the milk producing animal should consume, and (b) a protein supplement for the milk producing animal, the protein supplement providing at least one amino acid missing from a current diet of the milk producing animal; and providing additional feed to the milk producing animal according to the diet plan such that second milk is produced, the second milk having a second milk protein yield distinct from the first milk protein yield.

8. The system of claim 7, wherein the at least one milk protein yield coefficient is associated with at least one of methionine, lysine, isoleucine, leucine, and histidine.

9. The system of claim 7, wherein the at least one milk protein yield coefficient comprises coefficients for from five to twenty amino acids.

10. The system of claim 7, wherein the known feed type is a soybean meal.

11. The system of claim 7, the computer-readable storage medium having additional instructions stored which, when executed by the at least one processor, cause the at least one processor to perform operations comprising:

receiving a current milk production of the milk producing animal; and modifying the diet plan to maintain the current milk production using the feed type.

12. The system of claim 7, the computer-readable storage medium having additional instructions stored which, when executed by the at least one processor, cause the at least one processor to perform operations comprising:

receiving a current diet of the milk producing animal; and updating the current diet based on the diet plan, resulting in identification of at least one protein supplement for the milk producing animal.

13. A non-transitory computer-readable storage medium having instructions stored which, when executed by at least one processor, cause the at least one processor to perform operations comprising:

providing a first feed to a milk producing animal, the first feed having a feed type, the milk producing animal producing first milk having a first milk protein yield after consuming the first feed;

receiving a current milk production of the milk producing animal based on consumption of the feed;

identifying a digestible rumen undegradable protein (dRUP) fraction of the feed type;

generating an estimated milk protein yield of the feed type using the dRUP fraction and at least one milk protein yield coefficient, each milk protein yield coefficient within the at least one milk protein yield coefficient identifying how an amino acid affects the estimated milk protein yield;

indexing the feed type to a known feed type based on the estimated milk protein yield, resulting in an index value for the feed type;

generating, using the index value, a diet plan, the diet plan specifying (a) how much of the feed type the milk producing animal should consume, and (b) a protein supplement for the milk producing animal, the protein supplement providing at least one amino acid missing from a current diet of the milk producing animal; and providing additional feed to the milk producing animal according to the diet plan such that second milk is produced, the second milk having a second milk protein yield distinct from the first milk protein yield.

14. The non-transitory computer-readable storage medium of claim 13, wherein the at least one milk protein yield coefficient is associated with at least one of methionine, lysine, isoleucine, leucine, and histidine.

15. The non-transitory computer-readable storage medium of claim 13, wherein the at least one milk protein yield coefficient comprises coefficients for from five to twenty amino acids.

16. The non-transitory computer-readable storage medium of claim 13, wherein the known feed type is a soybean meal.

17. The non-transitory computer-readable storage medium of claim 13, having additional instructions stored which, when executed by the at least one processor, cause the at least one processor to perform operations comprising:

receiving a current milk production of the milk producing animal; and modifying the diet plan to maintain the current milk production using the feed type.

* * * * *